US006796043B2

(12) United States Patent
Jackson et al.

(10) Patent No.: US 6,796,043 B2

(45) Date of Patent: Sep. 28, 2004

(54) TARGET SYSTEM FOR USE WITH POSITION DETERMINATION SYSTEM

(75) Inventors: David A. Jackson, Point Roberts, WA (US); Stephen L. Glickman, Los Gatos, CA (US)

(73) Assignee: Snap-On Incorporated, Pleasant Prairie, WI (US)

( * ) Notice: Subject to any disclaimer, the term of this patent is extended or adjusted under 35 U.S.C. 154(b) by 0 days.

(21) Appl. No.: 09/892,906

(22) Filed: Jun. 28, 2001

(65) Prior Publication Data

US 2002/0023361 A1 Feb. 28, 2002

Related U.S. Application Data

(60) Provisional application No. 60/214,390, filed on Jun. 28, 2000.

(51) Int. Cl.[7] .......................................... G01B 11/275

(52) U.S. Cl. .......................... 33/293; 33/286; 382/151; 356/139.09; 356/620

(58) Field of Search .......................... 33/393, 286, 288, 33/203, 203.18, 600; 382/103, 104, 151, 291; 348/169; 250/559.4, 559.44; 356/139.09, 620

(56) References Cited

U.S. PATENT DOCUMENTS 3,330,044 A * 7/1967 MacMillan .............. 33/203.18
3,953,134 A * 4/1976 Appel et al. ................ 356/155
4,176,463 A * 12/1979 Ringle ..................... 33/203.18
4,303,338 A * 12/1981 Morrison et al. ........... 356/155
4,466,196 A * 8/1984 Woodruff ..................... 33/288
4,643,578 A 2/1987 Stern .......................... 356/376
4,726,122 A * 2/1988 Andersson ................... 33/288
4,782,599 A * 11/1988 Bergstrom ................... 33/608
4,977,524 A * 12/1990 Strege et al. ............... 700/279
5,024,001 A * 6/1991 Borner et al. ............ 33/203.18

(List continued on next page.)

FOREIGN PATENT DOCUMENTS

FR 2735861 A 6/1995
GB 2283 090 A 4/1995
WO WO 93/07443 4/1993
WO WO 98/48241 10/1998

OTHER PUBLICATIONS

Chief Automotive Systems Product Literature Genesis System, GMS, Revised Jun., 1998.

Blackhawk GmbH Product Literature "Sharkaligne", dated Aug., 1996. Original document (color) in German, together with a marked–up copy (black & white), with markup numerals indicating corresponding English–language translations (non–certified) on attached sheet.

Chief Automotive Systems Product Literature "Genesis Electronic Measuring System", GEMS, Revised May, 1993.

Hein Werner Corporation Publication "Cash$Profits", dated Dec., 1994, describing the "Shark" product.

*Primary Examiner*—Christopher W. Fulton
*Assistant Examiner*—Tania C. Courson
(74) *Attorney, Agent, or Firm*—McDermott Will & Emery LLC

(57) ABSTRACT

A target system for determining the location of a position on a vehicle comprises a target body, one or more target elements, a trigger, and a point definer. The target elements are disposed on the target body and are detectable by a position determination system. The trigger is positioned on the target body and is remote from the position determination system. The trigger operates the position determination system by selectively changing the detection of one or more of the target elements by the position determination system. The point definer extends from the target body, and the point definer includes a point its a distal end. The point is capable of being located adjacent the position on the vehicle and is at a known location from the target body. The position determination system determines a location of the target body after detecting the target elements disposed on the target body. Methods of using the target system are disclosed.

23 Claims, 10 Drawing Sheets

U.S. PATENT DOCUMENTS

| | | | | |
|---|---|---|---|---|
| 5,029,397 | A | | 7/1991 | Palombi |
| 5,365,668 | A | * | 11/1994 | Canovas et al. ......... 33/203.11 |
| 5,440,392 | A | * | 8/1995 | Pettersen et al. ........... 356/375 |
| 5,488,472 | A | | 1/1996 | January |
| 5,515,613 | A | | 5/1996 | Hinson |
| 5,535,522 | A | | 7/1996 | Jackson |
| 5,586,062 | A | | 12/1996 | Colarelli, III |
| 5,675,515 | A | | 10/1997 | January |
| 5,724,128 | A | | 3/1998 | January ................. 356/139.09 |
| 5,724,743 | A | | 3/1998 | Jackson |
| 5,886,782 | A | * | 3/1999 | Hedgecock, Jr. ............ 356/155 |
| 6,115,927 | A | * | 9/2000 | Hendrix ....................... 33/288 |
| 6,226,879 | B1 | * | 5/2001 | Baird ...................... 33/203.18 |
| 6,279,246 | B1 | * | 8/2001 | Van den Bossche .......... 33/556 |

* cited by examiner

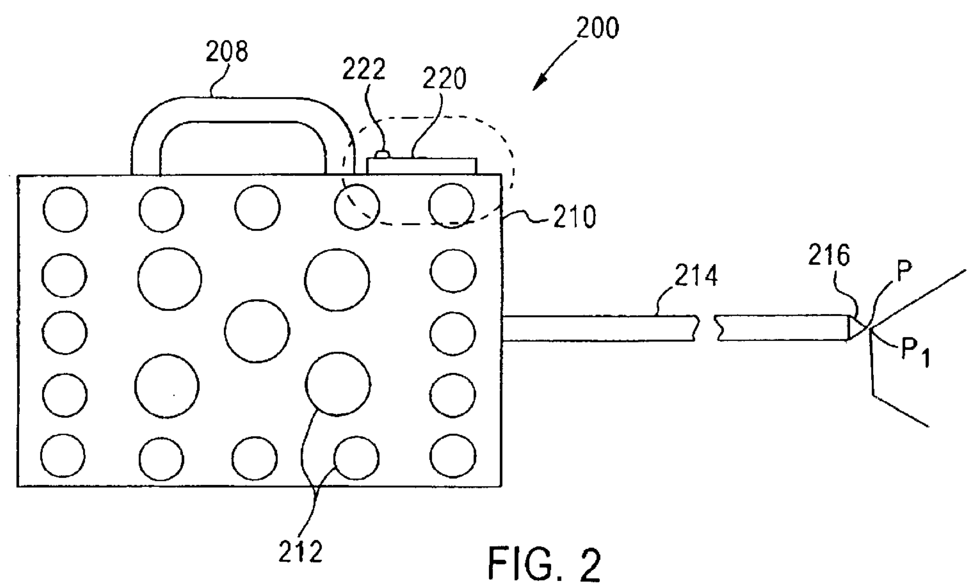
FIG. 2
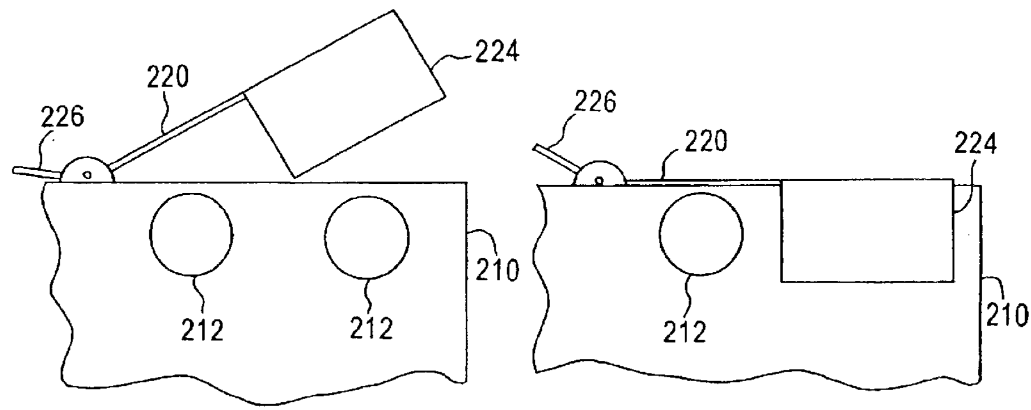
FIG. 4A
FIG. 4B

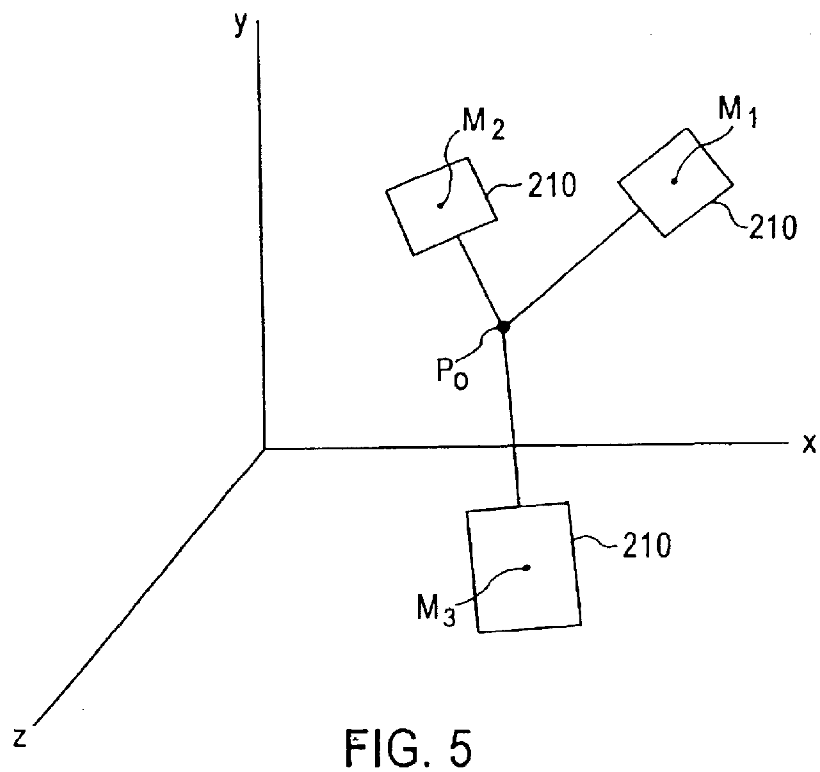
FIG. 5
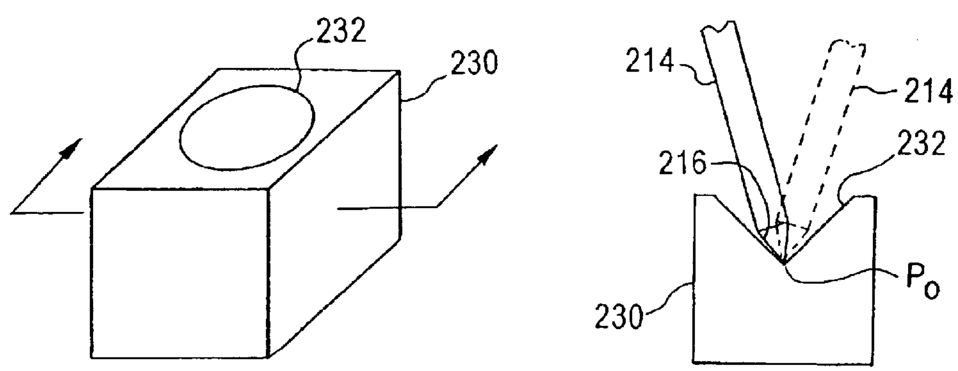
FIG. 6A
FIG. 6B

TARGET SYSTEM FOR USE WITH POSITION DETERMINATION SYSTEM

RELATED APPLICATIONS:

This application claims priority from U.S. Provisional Application Ser. No. 60/214,390, filed Jun. 28, 2000, incorporated herein by reference.

FIELD OF THE INVENTION

The present invention relates generally to motor vehicle alignment and, more specifically, to providing a target system for obtaining positional information regarding positions on a vehicle using a position determination system.

BACKGROUND OF THE INVENTION

Motor vehicle alignment systems are important for ensuring that the alignments of wheels on a vehicle are within the specifications provided by motor vehicle manufacturers. If the wheels are out of alignment, there may be excessive or uneven wear. In addition, the performance of the vehicle, particularly handling and stability, may be adversely affected if the wheels are not properly aligned. As used herein, the term "wheel" or "vehicle wheel" refers to the tire and wheel assembly found on a motor vehicle. Such an assembly generally includes a conventional tire that is mounted on a metal wheel or "rim."

The wheels of a motor vehicle may be aligned in a number of ways. For example, an operator or an alignment technician can use a vision imaging system such as a computer-aided, three-dimensional (3D) machine vision system that employs optical sensing devices, such as cameras, to determine the positions of various objects. Although such machine vision systems are typically used for alignment purposes, these systems can also be used to obtain other positional and angular orientation information about a motor vehicle. Examples of such apparatus and methods are disclosed in U.S. Pat. No. 5,724,743, entitled "Method and Apparatus for Determining the Alignment of Motor Vehicle Wheels," issued to Jackson, et al. on Mar. 10, 1998 and in U.S. Pat. No. 5,535,522, entitled "Method and Apparatus for Determining the Alignment of Motor Vehicle Wheels," issued to Jackson, et al. on Jul. 16, 1996, each incorporated herein by reference. The apparatus disclosed in these patents is sometimes called a "3D aligner" or an "aligner," hereinafter referred to as a vision imaging system. As used herein, the term "position determination system" refers to an alignment system, such as the vision imaging system, in addition to other components used in conjunction with the alignment system to obtain positional and angular orientation information about a motor vehicle.

The above-described position determination system provides information, such as the centers of rotation of the vehicle's wheels, which aids in the wheel alignment of a vehicle. Other positional information, such as ride height, toe curve, tilt angle, and the angular relationship of the body relative to the wheels, can aid a technician in aligning the wheels and also the body of the vehicle. The current position determination system, however, is not capable of obtaining this information. There is, therefore, a need for an improved position determination system capable of obtaining other positional information about a vehicle, such as ride height, toe curve, tilt angle, and the angular relationship of the body relative to the wheels.

SUMMARY OF THE INVENTION

This and other needs are met by a target system that can be used with a position determination system in determining the location of a position on a vehicle. The target system includes a target body, one or more target elements, and a point definer. The target elements are disposed on the target body and are detectable by the position determination system. The point definer extends from the target body, and includes a point capable of being located adjacent the position on the vehicle. The position determination system determines a location of the target body after detecting the target elements disposed on the target body. The point on the point definer can also be at a known location from the target body.

In one aspect, the point is at a distal end of the point definer. Also, the point can be at the vertex of a conical projection at the distal end of the point definer. Furthermore, the point definer can include one or more joints, which enable the point to be positioned at a different location relative to the target body, such as one of three positions. The one or more joints can each allow rotation of the point in one or more axis relative to the target body. Also, each joint can include a lock to selectively prevent or allow movement of the point relative to the target body In another aspect, the target system can include a trigger for operating the detection of the target system by the position determination system. The trigger can be positioned on the target body and is remote from the position determination system. The trigger operates the position determination system by selectively changing the detection by the position determination system of one or more of the target elements. For example, the trigger can be movable between two positions. In a first position, the trigger conceals the one or more target elements from the position determination system, and in a second position, the trigger exposes the one or more target elements to the position determination system.

In a further aspect, the target elements are positioned on a single line along the body, and the single line can be substantially parallel with a longitudinal axis of the target body. Also, the target system can include an attachment device to stabilize the position of the target body relative to the vehicle and to stabilize the point on the point definer relative to the position on the vehicle to be located. The attachment device can include an attachment arm and a connector that detachably connects to the vehicle. The attachment arm is attached to the target body by a first pivot and is attached to the connector by a second pivot.

Alternatively, the attachment device, such as one adapted to be attached to a strut of the vehicle, can include a receiver to which the point definer is attached and a connector that connects with the vehicle. The receiver, such as a cylindrical recess into which a portion of the point definer can be inserted, can include a reference feature, such as a flat plane, that defines the position of the attachment device relative to the point on the point definer. The connector can also define a positional relationship between the position on the vehicle to be located and the reference feature. The combination of the reference feature and the receiver can prevent movement of the point definer relative to the attachment device in three axes.

In another aspect, a method of obtaining a location of a position on a vehicle using a position determination system is provided. The method includes indicating the position with a target system, and imaging the target system with the position determination system to obtain the location. The target system used to indicate the position includes a target body, target elements disposed on the target body and detectable by the position determination system, and a point definer extending from the target body. The point definer includes a point capable of being located adjacent the position on the vehicle. The position determination system calculates the location of the target body and interpolates the location of the point from the location of the target body.

The point can be positionable relative to the target body in one of three point positions. If so, the target system is imaged and the location of the point is interpolated for each point position. The interpolated location of the point for each point position is then compared to an estimated location of the position on the vehicle. The location is obtained by choosing the interpolated location closest to the estimated location.

The target system can trigger the imaging of the target system by the position determination system. In so doing, a trigger can selectively change the detection by the position determination system of one or more of the target elements. For example, the trigger can selectively conceal or reveal one or more target elements respectively from or to the position determination system.

Calibrating the target system involves determining the positional relationship of the point relative to the target body. For example, the target system can be calibrated by positioning the target body of the target system in at least three different locations while fixing the point of the point definer adjacent to the position on the vehicle to be located. The location of the target body at each of the at least three different locations is then determined, and the point of the point definer is interpolated from the at least three different locations of the target body. Alternatively, the target system can be calibrated by positioning the target body of the target system in at least three different locations while maintaining the point definer within a calibration fixture. The location of the target body at each of the at least three different locations is then determined, and the point of the point definer is interpolated from the at least three different locations of the target body In one aspect, a method of measuring a body tilt angle of a vehicle using a position determination system is provided. The method includes indicating vehicle definition points on the vehicle using one or more target systems, imaging the one or more target systems to obtain a position for each of the vehicle definition points; defining a body tilt line using the positions of each of the vehicle definition points; defining a reference line; and calculating the body tilt angle between the body tilt line and the reference line. The calculated body tilt angle can be then compared to a specified range of body tilt angles.

The reference line can be along the plane defined by the surface upon which the vehicle is supported or along the plane defined by centers of rotation of wheels of the vehicle. The centers of rotation of the wheels are indicated using targets, which are positioned on the wheels and imaged by the position determination system.

The vehicle definition points can include points found on each side of the vehicle, as split by a vertical plane passing centrally through a length of the vehicle. Also, the vehicle definition points of the at least one set of vehicle definition points can be selected from identical locations common to both sides of the vehicle.

In still another aspect, a method of measuring a perpendicular distance on a vehicle using a position determination system is provided. The method includes indicating a reference point on the vehicle with a target system; imaging the target system to obtain a position of the reference point; defining a reference plane; and calculating the perpendicular distance between the reference plane and the reference point. The calculated perpendicular distance can be then compared to a specified range of perpendicular distances, such as ride height.

The reference plane can be defined by the surface upon which the vehicle is supported using at least three non-collinear points, which are indicated using the target system. The reference plane can also be defined by centers of rotation of wheels of the vehicle. The centers of rotation of the wheels are indicated using targets, which are positioned on the wheels and imaged by the position determination system.

In yet another aspect, a method of obtaining a toe curve for a wheel on a vehicle using a position determination system is provided. The method includes indicating a reference point on the vehicle with a target system; imaging the target system to obtain a position of the reference point; defining a reference plane; obtaining a first toe angle of the wheel; calculating a first perpendicular distance between the reference plane and the reference point with the first toe angle and the first perpendicular distance defining a first data point; changing the first perpendicular distance to a second perpendicular distance; obtaining a second toe angle of the wheel with the second toe angle and the second perpendicular distance defining a second data point; and interpolating a toe curve from at least two data points. The toe angles can be obtained by imaging a target positioned on the wheel using the position determination system. The calculated toe curve can be then compared to a specified range of toe curves.

The reference plane can be defined by the surface upon which the vehicle is supported or defined by centers of rotation of wheels of the vehicle. The centers of rotation of the wheels are indicated using targets, which are positioned on the wheels and imaged by the position determination system.

The second perpendicular distance can be obtained by vertically moving the reference point relative to the reference plane followed by imaging the target system again to obtain a second reference point. The second perpendicular distance is then calculated between the reference plane and the second reference point.

A toe angle can be extrapolated from the toe curve for a given perpendicular distance, and the extrapolated toe angle can then be compared to a specified range of toe angles for the given perpendicular distance. Also, a perpendicular distance can be extrapolated from the toe curve for a given toe angle, and the extrapolated perpendicular distance can be compared to a specified range of perpendicular distances for the given toe angle.

In a further aspect, a method of measuring alignment of a body of a vehicle relative to wheels of the vehicle using a position determination system is provided. The method includes indicating a plurality of body definition points on the vehicle with a target system; imaging the target system to obtain positions of the body definition points; calculating a body center line from the positions of the body definition points; obtaining a wheel center line; and calculating a body alignment angle between the body center line and the wheel center line. A calculated body alignment angle can be then compared to a specified range of body alignment angles.

Obtaining the wheel center line involves indicating the centers of rotation of the wheels using targets, which are positioned on the wheels, and imaging the targets with the position determination system to obtain positions of the wheels. In addition, a front center point of a front wheel track extending between the wheel definition points of two front wheels can be calculated, as well as a rear center point of a rear wheel track extending between the wheel definition points of two rear wheels. The wheel center line is then defined as including the front center point and the rear center point.

The plurality of body definition points can include two sets of two body definition points with each set of body definition points including body definition points found on each side of the vehicle, as split by a vertical plane passing centrally through a length of the vehicle. Also, the body definition points of each set of body definition points can be selected from identical locations common to both sides of the vehicle. Still further, the two sets of body definition points can includes a front set substantially adjacent to a front of the vehicle and a second set substantially adjacent to a rear of the vehicle.

Obtaining the body center line further involves calculating a front body center point of a front body line extending between the body definition points of the front set, and calculating a rear body center point of a rear body line extending between the body definition points of the rear set. The body center line is then defined as including the front body center point and the rear body center point.

Additional advantages of the present invention will become readily apparent to those skilled in this art from the following detailed description, wherein only an exemplary embodiment of the present invention is shown and described, simply by way of illustration of the best mode contemplated for carrying out the present invention. As will be realized, the present invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent like elements throughout, and wherein:

FIG. 2 is a side view of a target system;

FIGS. 4A and 4B are partial side views of a trigger for a target system with the trigger being in two different positions;

FIG. 5 is perspective view of three target systems with each target system being fixed at a single origin position $P_O$ with the target bodies of the respective target systems being orientated in different positions in space about the origin position $P_O$;

FIGS. 6A and 6B respectively are perspective and sectional side views of a fixture for use with calibrating the target system;

DETAILED DESCRIPTION OF THE PREFERRED EMBODIMENTS

The present position determination system is capable of obtaining positional information about a vehicle, such as ride height, toe curve, tilt angle, and the angular relationship of the vehicle's body relative to the vehicle's wheels. This is achieved, in part, by providing a target system that allows the position determination system to obtain the location of individual positions on the vehicle. Unlike previous targets, which were limited, in part, to obtaining the locations of the wheels, the current target system can be used to obtain the location of any position on the vehicle. Once these locations have been obtained, the position determination system, in conjunction with the target system, can obtain positional information about the vehicle, such as ride height, toe curve, tilt angle, and the relationship of the vehicle's body relative to the vehicle's wheels.

Figure 1:
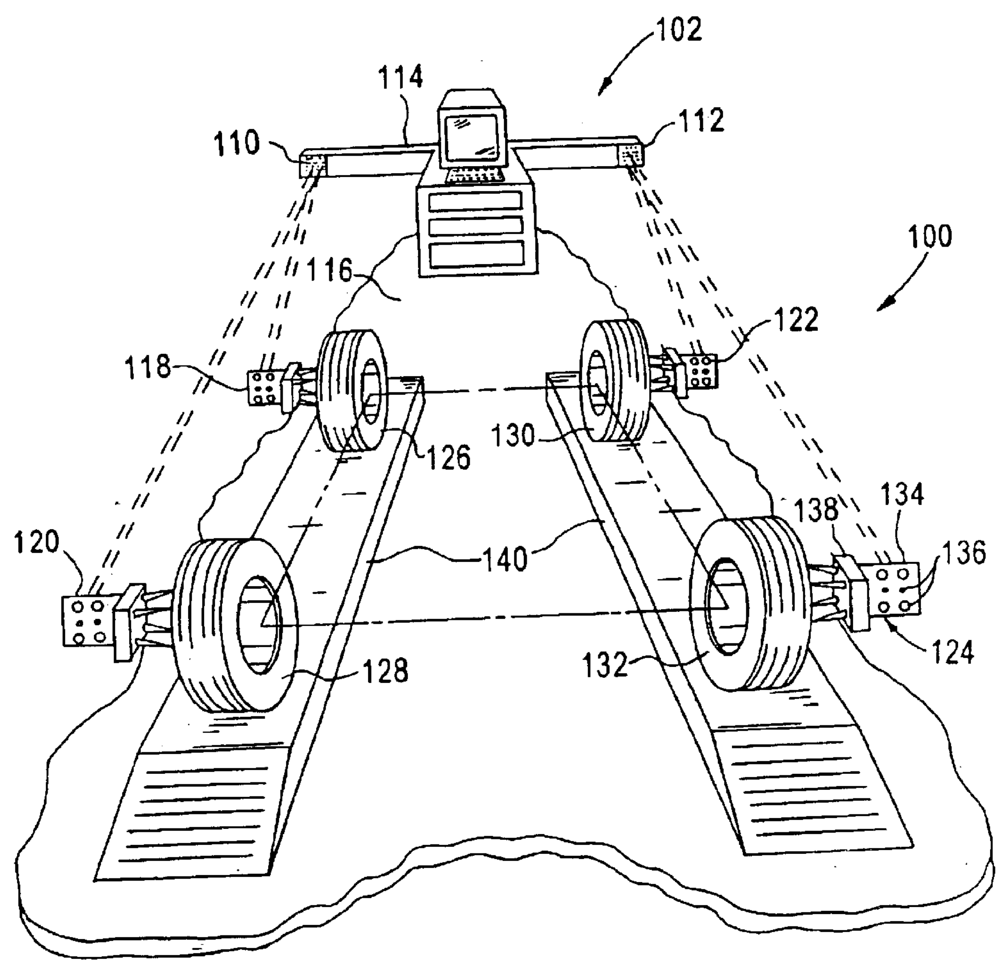
FIG. 1 is a perspective view of a position determination system and a vision imaging system.

An example of a position determination system is illustrated in FIG. 1. The position determination system 100 includes a vision imaging system 102 having a pair of fixed, spaced-apart cameras 110, 112 mounted on a beam 114. The beam 114 has a length sufficient to position the cameras 110, 112 respectively outboard of the sides of the vehicle to be imaged by the position determination system 100. Also, the beam 114 positions the cameras 110, 112 high enough above the shop floor 116 to ensure that the two targets 118, 120 on the left side of the vehicle are both within the field of view of the left side camera 110, and two targets 122, 124 on the right side of the vehicle are both within the field of view of the right side camera 112.

Targets 118, 120, 122, 124 are mounted on each of the wheels 126, 128, 130, 132 of the motor vehicle, with each target 118, 120, 120, 124 including a target body 134, target elements 136, and an attachment apparatus 138. The attachment apparatus 138 attaches the target 118, 120, 120, 124 to wheel 126, 128, 130, 132. An example of an attachment apparatus is described in U.S. Pat. No. 5,024,001, entitled "Wheel Alignment Rim Clamp Claw" issued to Borner et al. on Jun. 18, 1991, incorporated herein by reference. The target elements 136 are positioned on the target body 134. Examples of target bodies 134 and target elements 112 acceptable for use in the invention are described in U.S. Pat. No. 5,724,743.

In operation, once the position determination system 100 has been calibrated using a calibration target (not shown), as described in the incorporated references, a vehicle can be driven onto the rack 133, and, if desired, the vehicle lifted to an appropriate repair elevation. The targets 118, 120, 122, 124, once attached to the wheel rims, are then oriented so that the target elements 136 on the target body 134 face the respective camera 110, 112. The vehicle and model year can then entered into the vision imaging system 102 along with other identifying parameters, such as vehicle VIN number, license number, owner name, etc.

The location of the targets 118, 120, 122, 124 relative to the rim of the wheels 126, 128, 130, 132 to which the targets are attached are typically known to an accuracy of about 0.01" and about 0.01°. It should be understood that the position determination system 100 is not limited to these accuracies. Once the targets 118, 120, 122, 124 have been imaged in one position, the wheels 126, 128, 130, 132 are rolled to another position and a new image can be taken. Using the imaged location of the targets 118, 120, 122, 124 in the two positions, the actual position and orientation of the wheels 126, 128, 130, 132 and wheel axis can be calculated by the vision imaging system 102. Although the distance between the two positions varies, the distance is often approximately 8 inches.

As shown in FIG. 2, a target system 200 for use with the position determination system includes a target body 210, target elements 212, and a point definer 214. The target elements 212 are disposed on the target body 210, and by using, for example, a vision imaging system of position determination system (best shown in FIG. 1) to detect the target elements 212, the angular orientation and position in space of the target body 210 can be determined. The point definer 214 extends from the target body 210, and the point definer 214 includes a point P, which can be at a known angular orientation and location from the target body 210. The target system 200 can also include a handle 208 located on the target body 210 to allow for easy handling of the target body 210 by a user. Examples of target bodies 210, target elements 212, and a position determination system have been previously described with reference to FIG. 1.

In operation, the target system 200 is orientated such that the point P on the point definer 214 is located adjacent a position $P_1$ to be measured. The target system 200 is not limited as to a particular position to be measured, and examples of positions to be measured include where a wheel contacts ground, the top of a strut tower, a key hole, and the top of the wheel well. The position determination system, upon imaging the target elements 212 on the target body 210, determines the location and angular orientation of the target body 210. When the point P is at a known angular orientation and location from the target body 210, the position of point P can then also be determined by the position determination system. Also, upon taking a measurement of an initial position $P_1$, measurements can be made as to one or more other positions $P_2, P_3, P_4, \ldots P_n$ using the same technique or other techniques previously discussed with regard to the position determination system, and various relationships of these positions $P_1, P_2, P_3, P_4, \ldots P_n$ relative to one another can then be advantageously determined by the position determination system.

The point P can be located anywhere along the point definer 214. However, the point P is preferably located in a position on the point definer 214 that can be located immediately adjacent to the position $P_1$ to be measured. Because the position determination system determines the location of the point P on the point definer 214, the location of the position $P_1$ to be measured is inferred from the location of the point P. As such, the distance between the point P and the position $P_1$ during measurement of the point P is advantageously less than the accepted measuring error for determining the position $P_1$. Depending on factors, such as the criticality of locating the position Pi, the accepted measuring error for determining the position $P_1$ can vary.

In a current aspect of the target system 200, the point P is positioned at the vertex of a projection 216 extending from the distal end of the point definer 214. By locating the point P at the distal end of the point definer 214 and through the use of the projection 216, the point P can be advantageously located substantially adjacent a position $P_1$ to be measured. Additionally, if the projection 215 is conical, the vertex of a conical projection 216 can be rounded, which allows for easier placement of the point definer 214 and also minimizes damage that can be caused by a sharp vertex.

The point definer 214 is not limited as to a particular material. However, in one aspect, the point definer 214 is formed from a material that is dimensionally rigid such that during operation, the actual location and angular orientation of the point P relative to the target body 210 does not vary from the known location and angular orientation. Otherwise, if the actual and known locations and angular orientations of the point P relative to the target body 210 do not correlate, the calculated location of the calculated position $P_1$ will not correlate with the actual location of measured position $P_1$.

The point definer 214 is also not limited as to a particular shape. However, in one aspect, the point definer 214 is shaped to allow the point definer 214, and hence the point P, easy access to position $P_1$ to be measured. In a further aspect, the point definer 214 has a rod-like shape with a large length to cross-section ratio, as an extended length advantageously allows the point P to be located away from the target body 210. Also, a small cross-sectional area allows the point P to be introduced into a narrow location.

Figure 3A:
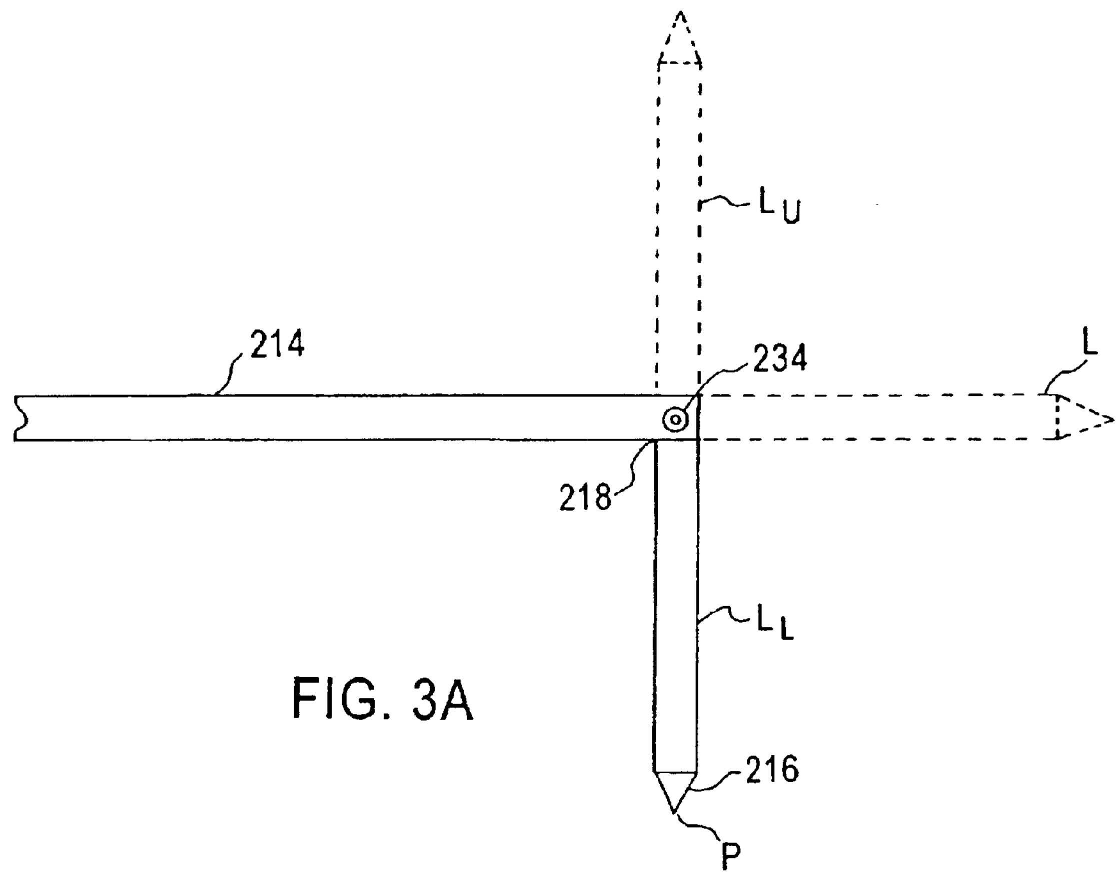
FIGS. 3A and 3B are partial side views of a point definer on a target system with the point definer having one or more joints.
Figure 3B:
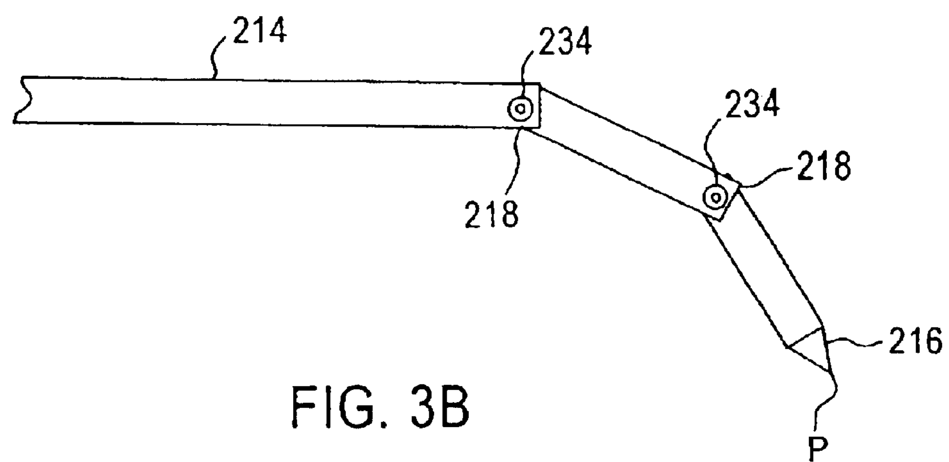

In one aspect of the target system 200, the point definer 214 is formed as a single piece to maintain the dimensional rigidity of the point definer 214. However, as illustrated in FIGS. 3A and 3B, the point definer 214 can include one or more joints 218. A joint 218 allows the point P of the point definer 214 to be positioned at a different location and angular orientation relative to the target body 210. The joint 218, for example, advantageously allows the point definer 214 and the point P to access a position $P_1$ to be measured that could not normally be accessed with a non-flexible point definer 214 because the shape of the target system 200 inhibits access of the point P to the position $P_1$ to be measured. Furthermore, a joint 218 can also be advantageous in situations where, although the point P of the target system 200 can access the position $P_1$ to be measured, the target body 210 is hidden from the detection by the position determination system. By having a joint 218, the point P can access the position $P_1$ to be measured, and the target body 210 can also be visible be the position determination system.

In a further aspect, as shown in FIG. 3A, the joint 218 allows the point P to rotate along one axis and to one of three locations: a normal location L, an upper location $L_U$, and a lower location $L_L$. The upper location $L_U$ and the lower location $P_L$ can be respectively oriented +/−90° with respect to an axis passing through the longitudinal axis of the point definer 214. The target system 200, however, is not limited in this manner. For example, as shown in FIG. 3B, two or more joints 218 can be used in the target system 200. Furthermore, each joint 218 can provide the point P with one or more axis of rotation relative to the target body 210. Still further, the point P can be rotated and placed in an unlimited number of locations and angular orientations relative to the target body 210. The joints 218 can also allow for extension of the length of the point definer 214. As such, the joint 218 can be used to change the distance of the point P from the target body 210 but not the angular orientation.

Where a joint 218 is used, the joint 218 can include a locking device 234 that selectively prevents or allows motion and/or rotation of the point P relative to the target body 210. The location of the point P can be determined by the location and angular orientation of the target body 210 by the position determination system because the point P is at a known location and angular orientation from the target body 210. As such, once the angular orientation and location of the point P relative to the target body 210 has been determined, any subsequent movement caused by the joint 218 will make the actual position of the point P unknown. As such, the locking device 234, when activated, prevents the joint 218 from allowing motion and/or rotation of the point P relative to the target body 210. Locking devices 234 so capable are known by those skilled in the art, and the target system 200 is not limited as to a particular locking device 234.

Because the joints 218 allow the point P to move relative to the target body 210, the new position and angular orientation of the point P relative to the target body 210 should be determined. The position determination system, however, can be used to determine the actual position of the point P if the one or more joints 218 allow the point P to be oriented relative to the target body 210 in a limited number of positions for the point P. If the point P can only be at a known number of positions, the position determination system can calculate each possible location and compare the calculated location with the expected location of point P. The position determination system can then determine that the expected location closest to the calculated location is the actual position of point P. For example, by using one joint 218 that allows the point P to rotate into one of three locations L, $L_U$, $L_L$, as discussed above with reference to FIG. 3A, the position determination system can determine the expected location for each of the three possible locations L, $L_U$, $L_L$ of the point P. The position determination system can then determine the correct location of the point P by choosing the expected location that falls closest to the likely or expected location in which the measured point $P_1$ is expected to be found. Alternatively, the correct location of the point P relative to the target body 210 can be entered canto the position determination system by a user of the system.

One problem when determining the location of the point P results from the target system 200 being frequently in motion and moving the point P from one location to a next location. In selected locations, a determination of the location of the point P is desired, and in other locations, a measurement of the location of the point P is not desired. In one aspect, the target system 200 identifies at which location a measurement of the point P will be taken so that the positional information for the measurement can be subsequently used during further calculations.

In one aspect, the position determination system makes a reading that is used for subsequent calculations only when the position of the point P is stable for a predetermined period of time, for example 20 seconds. This method, however, encounters difficulties when, for example, the point P is stable for the predetermined period of time, but the point P is at a location where a measurement is not desired.

In another aspect, a trigger 220 can be provided for the target system 200 to trigger the operation of the position determination system to take a measurement or, alternatively, to stop taking a measurement. Triggers 220 for starting or stopping an electronic device are known by those skilled in the art, and the target system 200 is not limited as to a particular trigger 220. For example, the trigger 220 can be a button on the vision imaging system of the position determination system.

In a current aspect, however, the trigger 220 is located on the target system 200. An advantage of placing the trigger 220 on the target system 200 is that a measurement can be taken immediately after the target system 200 and the point P has been properly positioned by a user of the target system 200. Furthermore, although the trigger 220 can be located anywhere on the target body 210, the trigger 220 is preferably located adjacent the handle 208 to allow the user holding the trigger body 210 via the handle 208 to easily activate the trigger 220. Although the trigger 220 can be physically wired to the position determination system, in one aspect of the target system 200, the trigger 220 remotely operates the position determination system. Remotely operated triggers 220 are known by those skilled in the art, and the target system 200 is not limited as to a particular type of remotely operated trigger 220. For example, by pressing a button 222, the remotely operated trigger 220 can send out a signal that is received by the vision imaging system of the position determination system, which then initiates a reading by the position determination system.

An alternative remote trigger 220 operates the position determination system by selectively changing the detection of one or more of the target elements 212 on the target body 210 by the position determination system, and any trigger 220 capable of selectively changing the imaging of vision imaging system of one of more of the target elements 212 is acceptable for use with the invention. For example, the trigger 220 can operate by changing a particular feature of the target element 212, such as shading, color, and/or size. This change of the particular feature of the target element 212 is then interpreted by the position determination system as a signal to initiate or stop a measurement.

In another example, as shown in FIGS. 4B, a cover 224 of the trigger 220 conceals at least one of the target elements 212; and therefore, the at least one target element 212 cannot be imaged by the position determination system. Furthermore, by pressing a lever 226, as illustrated in FIG. 4B, the cover 224 reveals the at least one target element 212. A measurement of the position of the point P can then be predicated upon whether the at least one target element 212 is visible or not. In a current aspect, a reading occurs when the at least particular target element 212 is visible. although a reading can alternatively occur when the at least one particular target element 212 is not visible.

Determining the location and the angular orientation of the point P with respect to the target body 210, allows the location of the position $P_1$ being measured to be inferred from the location of the point P. The position determination system obtains the location of the point P by first determining the location of the target body 210 and then uses the known location and angular orientation of the point P to the target body 210 to determine the actual location of the point P. Thus, even if the point P is located accurately adjacent the position $P_1$ to be measured and the location of the target body 210 is measured correctly by the position determination system, positional error can still be introduced into the final measurement if the relationship of the point P to the target body 210 used by the position determination system is incorrect.

The target system 200 is not limited as to a particular method of determining the relationship of the point P to the target body 210. For example, the target system 200 can be manufactured such that a known angular and positional relationship exists between the target body 210 and the point P. The known relationship, whether different for each target system 200 or the same, can then be entered into the position determination system for use therewith.

Although acceptable for use with the target system 200, a problem with the foregoing method is that the relationship between the point P and the target body 210 can change over time. For example, the point definer 214 can be bent during use, and this can cause the relationship between the point P to the target body 210 to change. Also, differences in operating temperatures, for example between winter and summer, can cause expansion and contraction of materials within the target system 200. Therefore, a method of periodically determining the relationship between the point P to the target body 210 is desirable.

A method of determining the relationship of the point P to the target body 210 according to the invention is schematically shown in FIG. 5. The method involves obtaining the location and angular orientation of the target body 210 at three or more locations $M_1$, $M_2$, and $M_3$ with the point P be fixed at a single origin position $P_O$ and the target body 210 being revolved around the origin position $P_O$. Without any additional information regarding the relationship of the point P to the target body 210, the position determination system can determine the location of the point P using the location and angular orientation of the target body 210 relative to three locations $M_1$, $M_2$, and $M_3$, and thus the relationship of the point P to the target body 210 can be obtained using mathematical methods known by those skilled in the art. In a further aspect, one or more measurements at additional locations $M_4 \ldots M_n$ can also be made, and these additional measurements can be used to ensure the accuracy of the measurements at the initial three locations $M_1$, $M_2$, and $M_3$.

It should be noted that the method of obtaining additional locations, beyond three, is not limited to this particular application. Obtaining four or more locations can be used during any type of measurement in which the target system 200 is being used. As stated, the additional measurements beyond three can be used to ensure the accuracy of the initial three measurements in determining the location of the point P.

The above-discussed process involves the point P being fixed at a single origin position $P_O$ as the target body 210 is moved and measured at several locations, and any method or apparatus capable of fixing the point P at a single location while allowing the target body 210 to move is acceptable for use with the target system 200. In a current aspect, as illustrated in FIGS. 6A and 6B, a calibration fixture 230 is provided to fix the point P on the point definer 214 at a single location. The calibration fixture 230 includes a conical recess 232 into which the conical projection 216 of the point definer 214 can be inserted. The conical recess 232 has a wider conical angle than the conical angle of the conical projection 216, and this allows the point definer 214 to be positioned at different angles within the conical projection 216 yet still enable the vertex of the conical projection 216 to be adjacent the vertex of the conical recess. In this manner, the point P of the target system 200 is fixed at a single origin point $P_O$, and the target body 210 is positionable at different locations.

In an alternative aspect of the target system 200, a preknowledge of the location and the angular orientation of the point P with respect to the target body 210 before determining a position $P_1$ is not required. As discussed above, with regard to calibrating the target system 200, the location and the angular orientation of the point P with respect to the target body 210 can be determined by fixing the point P at the position $P_1$ to be measured and obtaining the location and angular orientation of the target body 210 at three or more locations $M_1$, $M_2$, and $M_3$. From this information, the location and the angular orientation of the point P with respect to the target body 210 can be determined, and this can be used to infer the location of the position $P_1$ to be measured. This method, therefore, determines the location of each position $P_1$ to be measured by taking measurements of the target body 210 at three or more locations $M_1$, $M_2$, and $M_3$. In so doing, this method advantageously calibrates the target system 200 each time the location of a position $P_1$ is determined.

The target system 200 can also be mated with an attachment device. The attachment device functions to position, in a positionally stable manner, the point P and the target body relative respectively to a position $P_1$ being located and the position determination system. In so doing, an operator can properly position the target system 200 to take a measurement at a particular position $P_1$ and then advantageously leave the target system to perform other tasks, such as operating the position determination system.

The target system 200 is not limited as to a particular attachment device 250. For example, the attachment device 250 can be an adjustable fixture supported on the ground that holds the target system 200 and positions the target system 200 adjacent a position $P_1$ to be located. Another example of an attachment device 250 is a fixture that is attached to the vehicle. This fixture can be attached to the vehicle adjacent a particular location to be measured, and the point P on the target system 200 can also be positioned adjacent the particular position $P_1$ to be located.

Figure 7A:
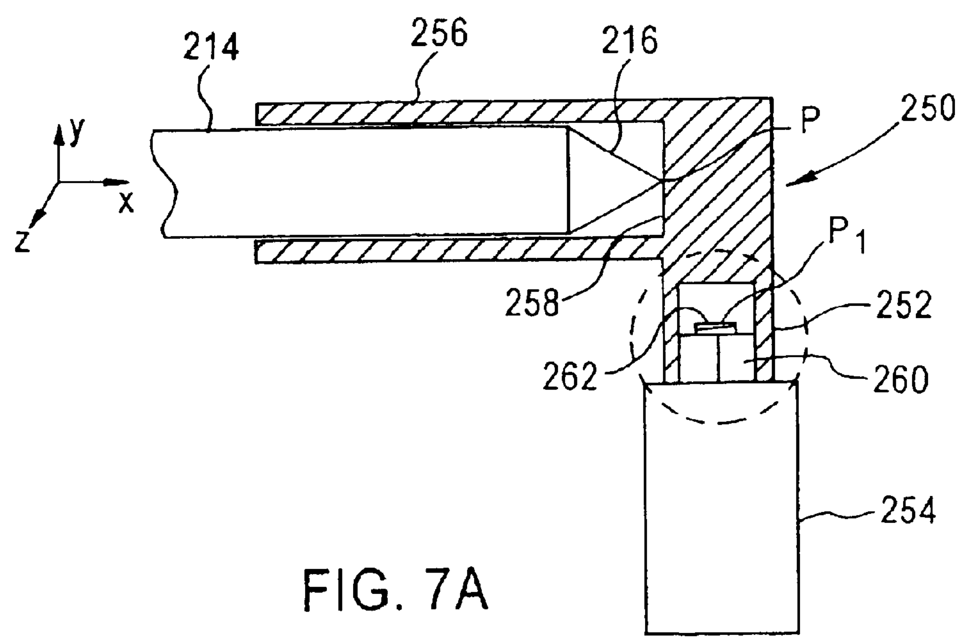
FIGS. 7A and 7B are sectional side views of an attachment device for use with the target system.
Figure 7B:
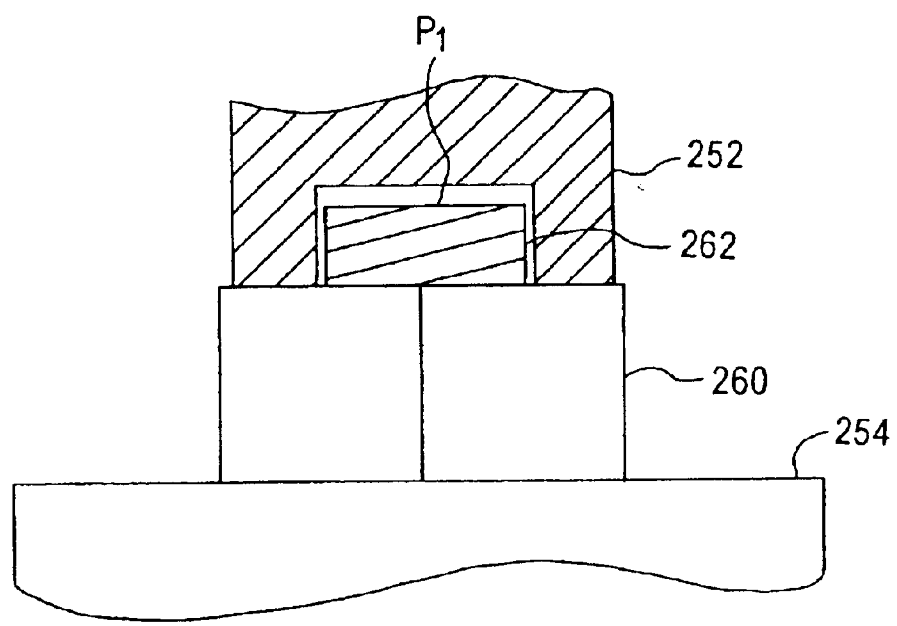

An example of an attachment device 250 is illustrated in FIGS. 7A and 7B. The attachment device 250 includes a connector 252 that connects the attachment device 250 to a feature on the vehicle. The attachment device 250 is not limited in the manner in which the connector 252 connects to the feature. However, the connector 252 advantageously connects to the feature in a manner that allows the connector 252 to define a consistent position of the attachment device 250 relative to the feature.

The attachment device 250 can also include a receiver 256 to which other portions of the target system 200, such as the target body (not shown) and point definer 214 are attached. The receiver 256 can also include a reference feature 258 that, when used in conjunction with the point P of the point definer 214, defines the position of the attachment device 250 relative to the point P and therefore also defines the position of the attachment device 250 relative to the target body. The connector 252 and the reference feature 258 are at a known positional relationship to each other. As such, the positional relationship of the point P and the target body to the feature to which the connector 252 is attached can also be determined.

The attachment device 250 is not limited as to a particular receiver 256 to which other portion of the target system 200 is attached. For example, the receiver 256 can be a locking mechanism that attaches to the point definer 214. Also, for example, as shown in FIG. 7A, the receiver 256 can define a cylindrical recess slightly larger than the cylindrical shape of the point definer 214. In use, the point definer 214 is slid into the receiver 256, and the receiver 256 prevents motion of the point definer 214 in two axis.

The attachment device 250 is also not limited as to a particular reference feature 258 that defines the positional relationship of the attachment device 250 to the point P and to the target body. For example, the reference feature 258 can define a conical recess slightly larger than the conical shape of the conical projection 216 of the pointer definer 214. Also, for example, as shown in FIG. 7A, the reference feature 258 can be planar, such that the point P on the point definer 214 presses against the reference feature 258 and prevents motion of the point definer in one axis. Also, when the planar reference feature 258 is combined with the cylindrically shaped receiver 256 having a receiver, as discussed above, the motion of the point definer 214 is prevented in three axes, and as is known by those skilled in the art, preventing motion in three axis is sufficient to accurately and consistently locate a fixture. Therefore, the point definer 214 and thus point P is accurately and consistently located relative to attachment device 250.

The attachment device 250 is not limited as to a particular feature on the vehicle to which the attachment device can be connected. For example, the attachment device 250 can be connected to the top of a wheel well, a door jamb, a door, and jacking points. Also, as shown in FIGS. 7A and 7B, the connector 252 can connect the attachment device 250 to a strut tower 254 of the vehicle.

Many strut towers 254 include a projection, such as a pin or grease nipple on the top of the strut tower 254, or as shown, a nut 260 and bolt 262 assembly. As shown in FIG. 7A, the connector 252 can slide over the bolt 262, or as shown in FIG. 7B, the connector can attach directly onto the bolt 260, for example using a magnetic connector 252. It should be noted, however, that the connector 252 is not limited as to the particular manner in which the connector 252 attaches to the strut tower 254 so long as a consistent positional relationship can be defined between the connector 252 and the strut tower 254.

Figure 8:
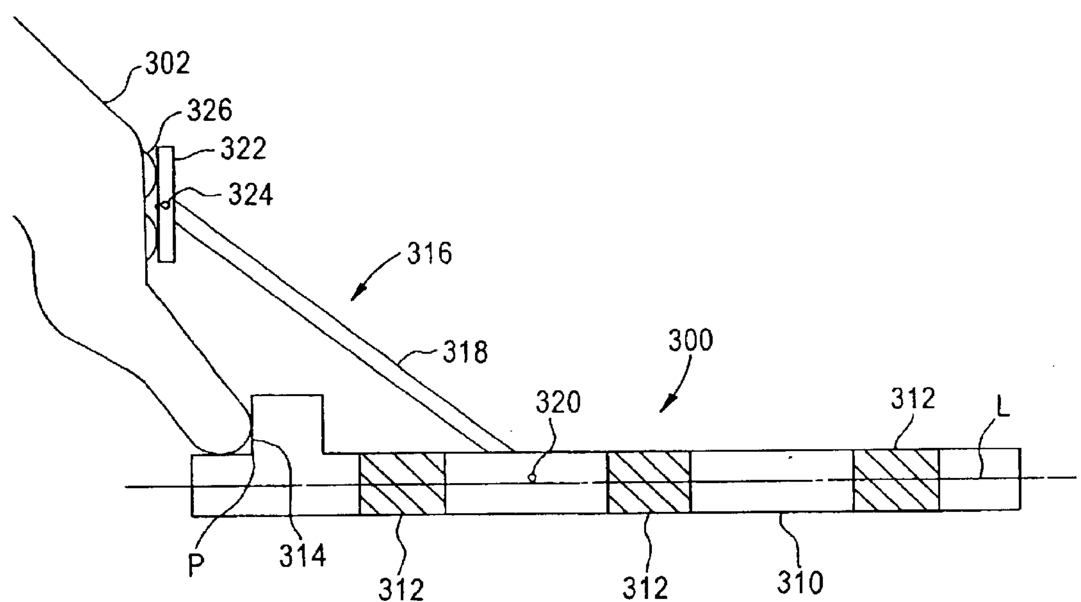
FIG. 8 is a side view of an alternative target system.

An alternative target system 300 is shown in FIG. 8. As with the previously discussed target system 200, the target system 300 includes a target body 310, target elements 312, and a point definer 314. The target system can also include an attachment device 316 to stabilize the position of the target body 310 relative to the vehicle 302. The target elements 312 are disposed on the target body 310, and by using the position determination system to image the target elements 312, the angular orientation and position in space of the target body 310 can be determined. The point definer 314 extends from the target body 310, and the point definer 314 includes a point P, which is at a known angular orientation and location from the target body 310. Examples of target bodies 310, target elements 312, and a position determination system have been previously described with reference to FIG. 1.

In an aspect of the target system 300, the target elements 312 are positioned along a single line L, although the target system 300 is not limited in this manner. Also the line L can be parallel with the longitudinal axis of the body 310. By positioning the target elements 312 along a single line L, the line L can be defined by the position determination system accurately reading two or more of the target elements 312.

In operation, the location of the point P can be interpreted by the position determination system. In so doing, a line is drawn from a camera of the position determination system through the point P. Although the position determination system can determine the distance of the point P from the camera, the distance can be more accurately determined using additional points. To more accurately determine the distance, a reference plane is defined through two points in space and vertical to a base plane. These two points can be determined using, for example, targets located on wheels of the vehicle (best shown in FIG. 11). The position determination system, with greater accuracy, can then determine the distance from the camera to the intersection of the reference plane and the line. By knowing the distance of the target system 300 to the reference plane, the distance from the camera to the point P can be accurately determined.

Attachments devices 316 are known in the art, and the target system 300 is not limited as to particular type. However, in a current aspect, the attachment device 316 includes an attachment arm 318 connected at one end to the body 310 by a first pivot 320, which enables the attachment arm 318 to pivot relative to the body 310. Also, at the other end, the attachment arm 318 can be connected to a connector 322 by a second pivot 324, which enables the attachment arm 318 to pivot relative to the connector 322. The connector 322 can also include one or more suction cups 326, which allow for a detachable connection to the vehicle 302. In operation, the attachment device 316 can advantageously adjust to differing vehicle profiles because the first and second pivots 320, 324 allow for reorientation of both the attachment arm 316 and the connector 322 relative to the body 310.

EXAMPLE 1

Figure 9A:
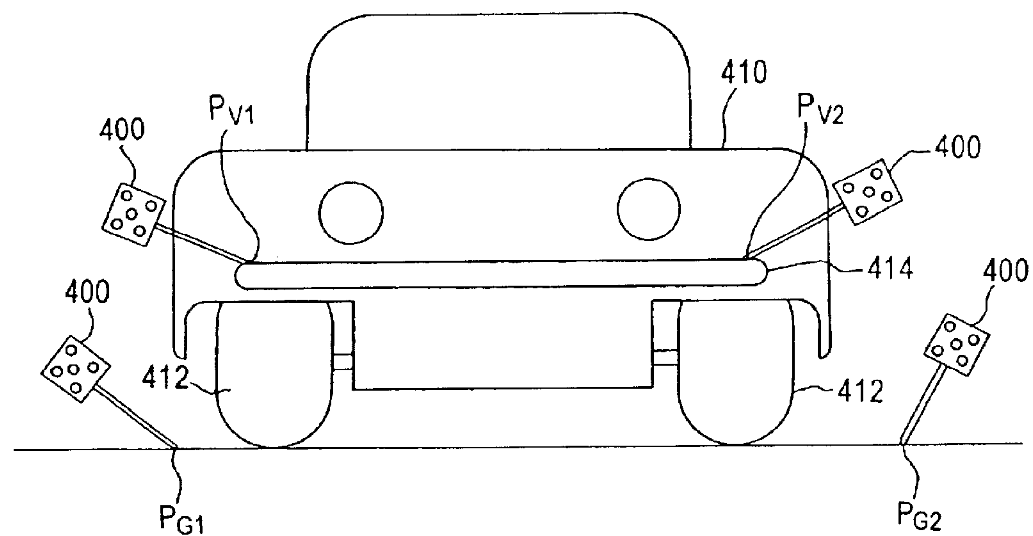
FIGS. 9A and 9B are respectively front and schematic views of the target system of FIG. 2 being used to obtain a tilt angle of a vehicle.
Figure 9B:
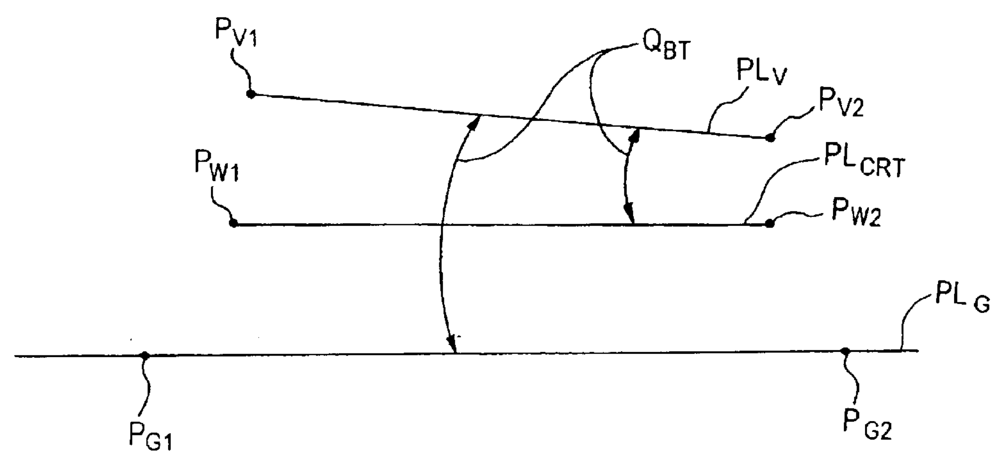

An example of the target system 400 in use is illustrated in FIGS. 9A and 9B. In this aspect, the target system 400 is used to determine a body tilt angle $\theta_{BT}$ of a vehicle 410. The body tilt angle is defined as the angular difference between a reference line or plane $PL_{CRT}$, $PL_G$ and a line or plane $PL_v$ that defines the body of the vehicle 410. Although use of the target system 400 is not limited as to a particular reference line or plane, the reference line or plane can be a plane $PL_G$ defined by the surface (or ground) upon which the vehicle is supported or a plane $PL_{CRT}$ defined by the centers of rotation of the vehicle's wheels 412.

The line or plane $PL_V$ that defines the body of the vehicle 410 is not limited as to a particular line or plane. However, the line or plane advantageously includes vehicle definition points $P_V$ found on each side of the vehicle 410, as split by a vertical plane passing centrally through the length of the vehicle 410. Additionally, as the vehicle 410 is typically substantially identical from one side to the other, at least one set of vehicle definition points $P_V$ can be selected from an identical location common to both sides of the vehicle 410. In this manner, a more accurate representation of the body tilt can be provided. Also, by increasing the distance between each vehicle definition point $P_V$, a more accurate representation of the body of the vehicle 410 can be provided.

As shown in FIG. 9B, the body tilt line $PL_V$ is defined by two vehicle definition points $P_{V1}$, $P_{V2}$, which correspond to identical locations on a bumper 414 of the vehicle 410. A body tilt plane $PL_V$, for example, would require at least one additional vehicle definition point to be defined, and the additional vehicle definition point (not shown), for example, could be found on the rear bumper.

In operation, both the reference plane or line $PL_G$ or $PL_{CRT}$ and the body tilt plane or line $PL_V$ are first defined using the position determination system. The plane or line $PL_G$ of the ground is obtained by using the target system 400 in conjunction with the position determination system to obtain the positions of two or more ground definition points $P_{G1}$, $P_{G2}$. The position determination system then uses the positions of the ground definition points $P_{G1}$, $PG_{G2}$ to define the reference plane or line $PL_G$.

Although not illustrated, the reference plane or line $PL_{CRT}$ of the wheels can be obtained using the target system 400 in conjunction with the position determination system to obtain the positions of two or more wheel definition points $P_{W1}$, $P_{W2}$. Alternatively, the wheel definition points $P_{W1}$, $P_{W2}$ can be obtained using targets (best illustrated in FIG. 10B and described with reference to FIG. 1) specifically used for defining the centers of tire rotation. The position determination system then uses the positions of the wheel definition points $P_{W1}$, $P_{W2}$ to define the reference plane $PL_{CRT}$ of the wheels 412. As used herein, a "wheel definition point" is a well-defined point on the wheel. For example, the wheel definition point can be the point at which the wheel axis passes through the rim plane.

The plane or line $PL_V$ of the vehicle's body tilt is obtained by using the target system 400 in conjunction with the position determination system to obtain the positions of two or more vehicle definition points $P_{V1}$, $P_{V2}$. The position determination system then uses the positions of the vehicle definition points $P_{V1}$, $P_{V2}$to define the plane or line $PL_V$ of the vehicle's body tilt.

After the reference plane or line $PL_G$ or $PL_{CRT}$ and the body tilt plane or line $PL_V$ are defined, the position determination system calculates the body tilt angle $\theta_{BT}$ using arithmetic methods known by those having skill in the art. For a typical vehicle 410, the desired body tilt angle $\theta_{BT}$ is 0°, or similarly, the reference plane or line $PL_G$ or $PL_{CRT}$ is desired to be parallel to the body tilt plane or line $PL_V$. However, a particular vehicle 410 may have a specified range in which the body tilt angle $\theta_{BT}$ may fall before adjustment of the body is required.

In one aspect, the position determination system compares the calculated body tilt angle $\theta_{BT}$ with the specified range of body tilt angles $\theta_{BT}$ and can alert the technician that the body tilt angle $\theta_{BT}$ has exceeded the specified range. Additionally, the position determination system can store the specified ranges of body tilt angle $\theta_{BT}$ for a specific vehicle so that a technician does not have to enter in the range, but instead, only indicate to the position determination system the type of vehicle being measured.

EXAMPLE 2

Figure 10A:
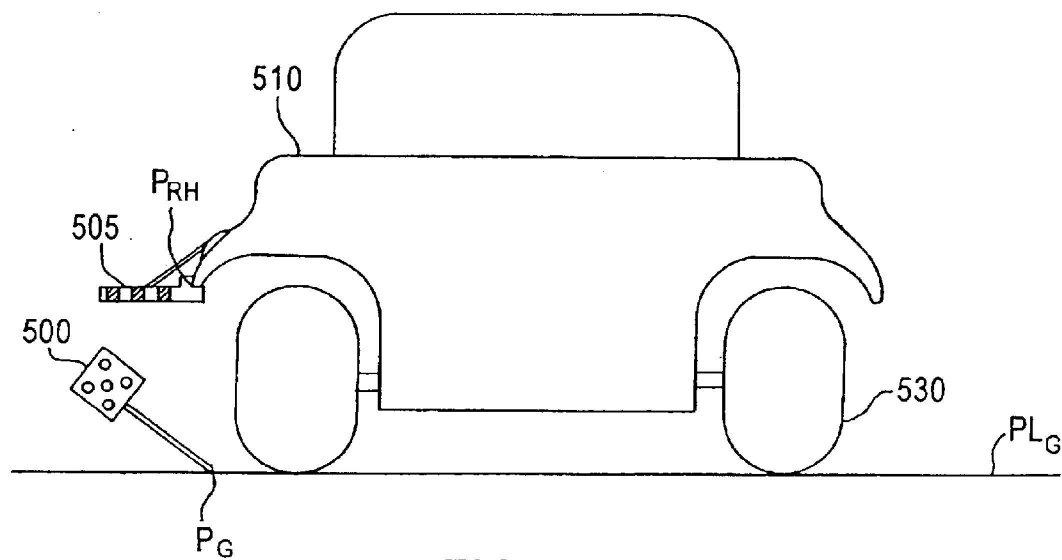
FIGS. 10A and 10B are respectively front and perspective views of the target systems of FIGS. 2 and 8 being used to obtain a ride height of a vehicle.
Figure 10B:
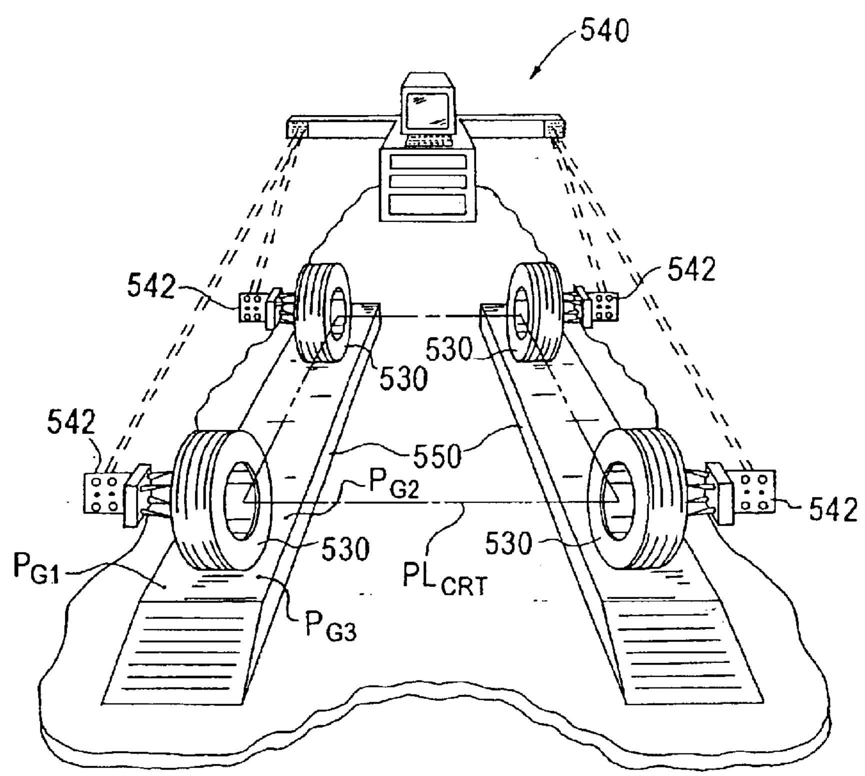

An additional example of the target system 500 in use is illustrated in FIGS. 10A and 10B. In this aspect, target systems 500, 505 are used to determine a perpendicular distance from a reference plane to a particular point on a vehicle 510. One example of a particular perpendicular distance to be measured is ride height, although other measurements can be obtained using this method. Ride height is defined as the perpendicular distance of a point on the vehicle 510 from a reference plane, such as plane $PL_G$ the vehicle 510 is supported on. This plane $PL_G$,for example, could be ground or a rack upon which the vehicle 510 is supported.

Ride height is particularly important when aligning the wheels 530 of the vehicle 500. Before an alignment of the wheels 530 can be performed, it is generally desirable to measure and adjust the ride height to within a specified tolerance before continuing the alignment process. Although ride height and the specified tolerance is typically defined by the manufacturer of the vehicle, the process of determining ride height is not limited in this regard.

As illustrated in FIG. 10A, a target system 505, for example, the target system illustrated and discussed with regard to FIG. 8, is used in conjunction with the position determination system to obtain the location of a reference point $P_{RH}$, which is used in determining ride height of the vehicle 200. In one aspect, the reference point $P_{RH}$ is located on the wheel well, although the location of the reference point $P_{RH}$ is not limited in this regard. For example, a particular manufacturer may choose to measure ride height from another reference point, and this reference point can be also obtained using the target system 505.

In operation, the reference plane $PL_G$ is defined using the position determination system. The reference plane $PL_G$ is obtained by using the target system 500 in conjunction with the position determination system to obtain the positions of three or more ground definition points $P_{G1}$, $P_{G2}$, $P_{G3}$. As is known to those having skill in the art, at least three non-collinear points are required to define a plane. As such, the plane $PL_G$ is determined by obtaining positions of at least three non-collinear points ($P_{G1}$, $P_{G2}$, and $P_{G3}$) on the plane $PL_G$. The position determination system then uses the positions of the ground definition points $P_{G1}$, $P_{G2}$, $P_{G3}$ to define the reference plane $PL_G$.

In another aspect, the plane $PL_G$ is determined by taking measurements of three noncollinear points ($P_{G1}$, $P_{G2}$, and $P_{G3}$) that are located adjacent to the wheel 530 at which ride height is to be measured. The surface, for example, the rack 550 on which the vehicle 510 is supported, may not be sufficiently planar to provide for an accurate measurement of ride height. As such, a plane $PL_G$,for example defined by points taken adjacent three separate wheels 530, may not accurate define the surface upon which the wheels 530 are supported. However, by restricting the location of three measurement to locations immediately adjacent the particular wheel 530 at which ride height is to be measured, a more accurate measurement of ride height can be obtained.

The reference plane $PL_G$ is not limited to the plane $PL_G$ the vehicle 510 is supported on. Other possible references planes can be used, for example, the plane $PL_{CRT}$ defined by the centers of rotation of the vehicle's wheels 530. Although not illustrated and as discussed with regard to Example 1, the plane $PL_{CRT}$ of the wheels can be obtained using a target system 500 in conjunction with the position determination system to obtain the positions of three or more wheel definition points. Alternatively, the wheel definition points can be obtained using the targets illustrated in FIG. 10B and described with reference to FIG. 1. The position determination system then uses the positions of the wheel definition points to define the reference plane $PL_{CRT}$ of the wheels.

The reference plane $PL_G$ can also be determined by extrapolating the location of the reference plane $PL_G$ from another plane. For example, as illustrated in FIG. 10B, the position determination system 540 can be used to determine the plane $PL_{CRT}$ defined by the center of the rotation of the wheels 530. As the perpendicular distance between this plane $PL_{CRT}$ and the reference plane $PL_G$ can be assumed to be known, which is the radius of the wheels 530, the location of plane $PL_G$ can be extrapolated. In another aspect, the ride height can be determined by measuring the perpendicular distance from the plane $PL_{CRT}$ defined by the center of the rotation of the wheels 230 to the reference point $P_{RH}$ for ride height without extrapolating the perpendicular distance between plane $PL_{CRT}$ and the plane $PL_G$.

After the reference point $P_{RH}$ and the reference plane $PL_G$ or $PL_{CRT}$ have been defined, the position determination system 540 calculates the ride height by computing the perpendicular distance from the reference plane $PL_G$ or $PL_{CRT}$ to the reference point $P_{RH}$. For a typical vehicle 510, the desired ride height may be a specified range. Accordingly, in one aspect, the position determination system compares the calculated ride height with the specified range of ride heights. Additionally, the position determination system can store the specified ranges of ride height for a specific vehicle so that a technician does not have to enter in the range, but instead, only indicate to the position determination system the type of vehicle being measured.

EXAMPLE 3

Figure 11:
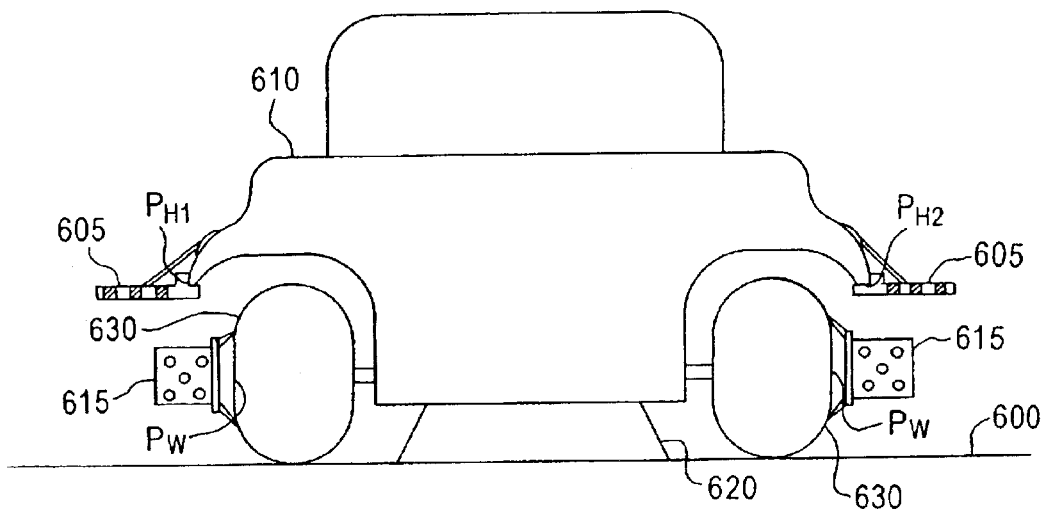
FIG. 11 is a front view of the target system of FIG. 8 being used to obtain a toe curve for a wheel of a vehicle.

An additional example of the target system in use is illustrated in FIG. 11. In this aspect, the toe curve of a vehicle wheel 630 can be obtained with respect to the perpendicular distance the vehicle wheel 630 is away from a reference point $P_H$ or plane. Toe is, as known in the art, the inward or outward angular rotation of a vehicle wheel 630 about a vertical axis passing through the center of the vehicle wheel 630. Also, as is also known in the art, the toe (or toe angle $\alpha$) of a vehicle wheel 630 varies depending upon the perpendicular distance a point $P_H$ on the vehicle 610 is away from a reference plane, such as a plane $PL_{CRT}$ defined by the center of wheel rotation of the vehicle wheels 630. The perpendicular distance can be determined in the same manner as ride height is determined, which is discussed in Example 2.

As the vehicle 610 is raised or lowered, which changes the perpendicular distance, the geometry of the suspension supporting the vehicle wheel 630 also changes and this change of geometry changes the toe. A toe curve is a plot of the toe angle $\alpha$ of the vehicle wheel 630 relative to the perpendicular distance the point $P_H$ is away from the reference plane. The toe angle $\alpha$ and/or the toe curve for each vehicle wheel 630 can be obtained separately or simultaneously.

As illustrated in FIG. 11, targets 615, are used in conjunction with the position determination system, can be used to obtain wheel definition points $P_W$ and angular orientations or toe angle $\alpha$ of the wheels 630. These targets 615 can be, for example, similar to the targets illustrated in FIG. 10B and described with reference to FIG. 1. A target system 605, for example the target system illustrated and discussed with regard to FIG. 8, is used in conjunction with the position determination system to obtain the location of a reference point $P_H$, which can be used in determining the perpendicular distance. Although not necessary, in one aspect, the target system 605 is positioned near the wheel 630, such as on a wheel well, as shown, or on the hood of the vehicle 610. If the target system 605 is located to be approximately the same distance away from the position determination system as the targets 615, the position determination system can determine the distance to target system 615. This distance can then be advantageously used by the position determination system to determine the relative movement of reference point $P_H$ without the need to measure the distance from the position determination system to the reference point $P_H$.

In operation, a reference point $P_H$ can be defined using the target systems 605 in conjunction with the position determination system using the target system 605, and the perpendicular distance used in determining the toe curve is the perpendicular distance from the center of wheel rotation reference plane $PL_{CRT}$ (plane $PL_{CRT}$ is best shown in FIG. 10B) to the reference point $P_H$. Alternatively, a reference plane can be defined using three or more of the reference points $P_{H1}$, $P_{H2}$ . . . $P_{Hn}$, and the perpendicular distance used in determining the toe curve is the perpendicular distance from the reference plane to a wheel definition point $P_W$. It should be noted that any reference point or plane can be used so long as the reference point or plane is stationary relative to the vehicle 610 when the vehicle 610 is moved.

Additionally, the toe angle $\alpha$ for each vehicle wheel 630 can be obtained for different perpendicular distances. This information is obtained by moving the vehicle 610 vertically relative to the vehicle wheels 630 while obtaining both the toe angle $\alpha$ and the perpendicular distance, and any manner of moving the vehicle 610 vertically relative to the vehicle wheel 630 is acceptable for this calculation. For example, a lift 620 can be used to raise the vehicle 610 a set distance. Alternatively, additional weight can be applied to the vehicle 610, and this additional weight will cause the vehicle 610 to move closer to ground 600, whereas the vehicle wheels 630 will remain stationary relative to ground 600.

Figure 12:
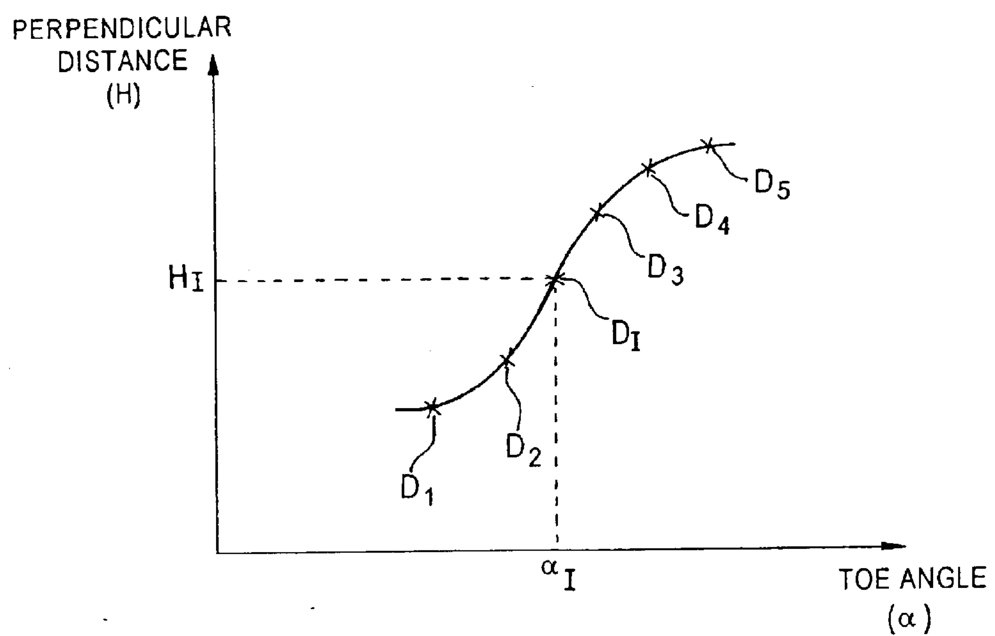
FIG. 12 is a graph of data points of toe angle relation to perpendicular distance.

With two or more data points $D_1$, $D_2$, . . . $D_N$ of toe angle $\alpha$ relative to perpendicular distance calculated using the above described method, the position determination system can interpolate a toe curve. As illustrated in FIG. 12, from the data points $D_1$, $D_2$, . . . $D_N$, and any manner of interpolating a curve from data points is acceptable. It should be noted that an additional number of data points beyond two increases the correlation between the calculated toe curve and an actual toe curve. Furthermore, only the toe angle $\alpha$ and not the perpendicular distance need be calculated by the position determination system if the vehicle 610 can be vertically moved relative to the vehicle wheels 630 to a precise distance, and the position determination system can obtain this distance so as to compare the distance with a calculated toe angle $\alpha$.

After the toe curve has been interpolated from the data points $D_1$, $D_2$, . . . $D_N$, the position determination system can extrapolate from the toe curve one or more data points $D_1$ to obtain a perpendicular distance $H_I$ for a given toe angle $\alpha_I$ or, alternatively, obtain a toe angle $\alpha_I$ for a given perpendicular distance $H_I$. Additionally, the position determination system can compare the calculated toe curve to a specified desired range for a toe curve or compare a particular toe angle $\alpha$ or perpendicular distance H to a specified desired range for the toe angle $\alpha$ or perpendicular distance H. The specified desired range, for example, can be obtained by the manufacturer of the vehicle 610, although the position determination system is not limited in this manner. Furthermore, the computation of the toe curve may require that the vehicle 610 be at a certain base weight to calibrate the calculated toe curve; however, the position determination system is not limited in this manner.

The comparison of the calculated toe curve, which corresponds to the actual toe curve, to the specified desired range for the toe curve can then be used by a technician to align and/or make adjustments to the vehicle 610, vehicle wheels, and/or vehicle suspension to bring the actual toe curve to within the specified desired range for the toe curve. Additionally, the position determination system can store the specified ranges of the toe curve for a specific vehicle so that a technician does not have to enter in the range, but instead, only indicate to the position determination system the type of vehicle being measured.

EXAMPLE 4

Figure 13:
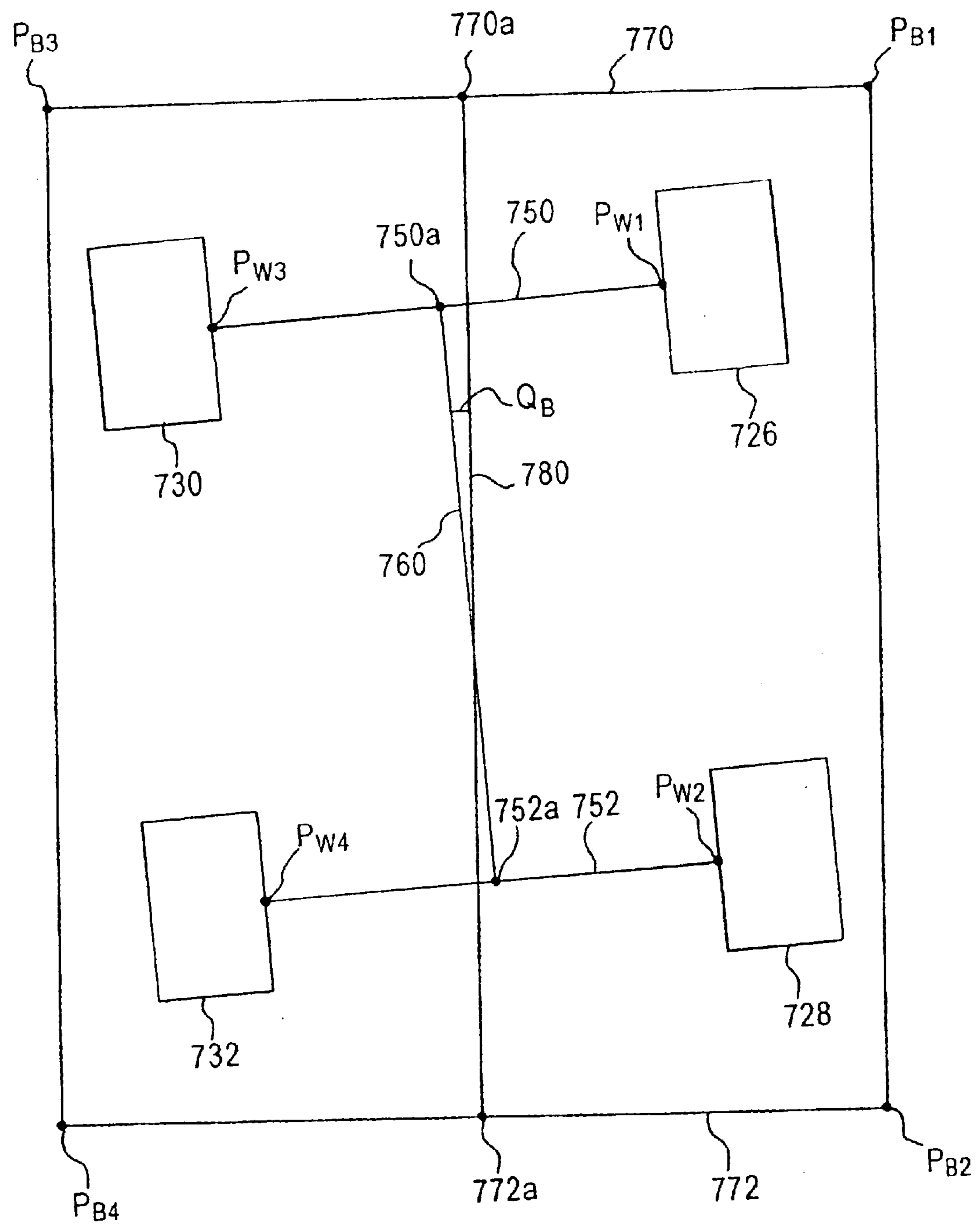
FIG. 13 is a schematic view of the points obtained by the position determination system in conjunction with the target system, which are used to obtain an angular relationship of the body of the vehicle relative to the wheels of the vehicle.

An additional example of the target system in use is schematically illustrated in FIG. 13. In this aspect, the target system is to obtain a measure of the alignment of the body of the vehicle relative to the wheels. As is known in the art, the body of the vehicle may be located on a frame of the vehicle or the body may be combined with the frame into what is known as a unibody. Although, for example, the frame of the vehicle may be perfectly aligned with the wheels of the vehicle, the body may not be aligned on the frame, and the body can therefore point in a different direction than the wheels. This misalignment between the body and wheels can reduce the aerodynamic efficiency of the vehicle; and therefore, a method of measuring this misalignment using the target system and the position determination system is provided.

In operation, wheel definition points $P_{W1}$, $P_{W2}$, $P_{W3}$, $P_{W4}$ are obtained for each of the wheels 726, 728, 730, 732 using targets in conjunction with the position determination system, and any targets capable of obtaining the wheel definition points $P_{W1}$, $P_{W2}$, $P_{W3}$, $P_{W4}$ is acceptable. In one aspect, however, the targets can be the targets illustrated in FIG. 11 and described with reference to FIG. 1. Alternatively, the targets can be the target system 200 illustrated and described with regard to FIG. 2.

After the wheel definition points $P_{W1}$, $P_{W2}$, $P_{W3}$, $P_{W4}$ are obtained, the position determination system calculates the center point 750*a* of a front wheel track 750 and the center point 752*a* of a rear wheel track 752. The front wheel track 750 extends between the wheel definition points $P_{W1}$, $P_{W3}$ of the two front wheels 726, 730. Also, the rear wheel track 752 extends between the wheel definition points $P_{W2}$, $P_{W4}$of the two rear wheels 728, 732. Once the center points 750*a*, 752*a* of the wheel tracks 750, 752 have been obtained, a wheel center line 760 is defined between the two center points 750*a*, 752*a*. The wheel center line 760 can then be subsequently used as a measure of the vehicle wheels.

The body of the vehicle is defined using body definition points $P_B$ using a target system in conjunction with the position determination system, and any target system capable of obtaining the body definition points $P_B$ is acceptable. In one aspect, the target system can be the target system 200 illustrated and described with regard to FIG. 2. Although not limited to a particular number of body definition points PB, in a current aspect, two sets of two body definition points $P_{B1}$, $P_{B2}$, $P_{B3}$, $P_{B4}$, for a total of at least four points, are used to define the body of the vehicle. As used herein, a "body definition point" is a well-defined point on the body. For example, the body definition point can be a key hole for a door handle or a jacking point.

Although not limited in this manner, each set of points advantageously includes body definition points $P_B$ found on each side of the vehicle 410, as split by a vertical plane passing centrally through the length of the vehicle. Additionally, as the vehicle is typically substantially identical from one side to the other, each set of points advantageously can be selected from an identical location common to both sides of the vehicle. Also, the two sets of points are advantageously selected to provide one set in the front of the vehicle and one set in the rear of the vehicle. By increasing the distance between each body definition points $P_{B1}$, $P_{B2}$, $P_{B3}$, $P_{B4}$, a more accurate representation of the body can be provided.

After the body definition points $P_{B1}$, $P_{B2}$, $P_{B3}$, $P_{B4}$ are obtained, the position determination system calculates the front body center point 770*a* of the front body line 770 and the rear body center point 772*a* of the rear body line 772. The front body line 770 extends between the body definition points $P_{B1}$, $P_{B3}$of the front set of points. Also, the rear body line 772 extends between the wheel definition points $P_{B2}$, $P_{B4}$ of the rear set of points. Once the center points 770*a*, 772*a* of the body lines 770, 772 have been obtained, a body center line 780 is defined between the two center points 770*a*, 772*a*. The body center line 780 can then be subsequently used as a measure of the vehicle body.

Once the body center line 780 and the wheel center line 760 have been defined, an angle $\theta_B$ can be obtained between these lines with the angle between an indication of the misalignment between the body and the wheels of the vehicle. Also, once this body alignment angle $\theta_B$ has been obtained, the position determination system can compare the body alignment angle $\theta_B$ to a desired range, and this comparison can then be used by the technician as an aide in the alignment of the vehicle. Additionally, the position determination system can store the specified ranges of the body alignment angle $\theta_B$ for a specific vehicle so that a technician does not have to enter in the range, but instead, only indicate to the position determination system the type of vehicle being measured.

The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only an exemplary aspect of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A target system for use with a position determination system in determining the location of a position on a vehicle, comprising:

a target body;

one or more target elements disposed on the target body and detectable by the position determination system; and a point definer extending from the target body, the point definer including a point capable of being located adjacent the position on the vehicle, the point definer further including one or more joints that enable the point to be positioned at a different location relative to the target body, wherein the position determination system is configured to determine a location of the target body after detecting the target elements disposed on the target body.

2. The system according to claim 1, wherein the one or more joints each allow rotation of the point in one or more axes relative to the target body.

3. The system according to claim 1, wherein the point definer includes one joint allowing the point to rotate along one axis, the point being positionable in any one of three positions relative to the target body.

4. The system according to claim 1, wherein each joint includes a lock to selectively prevent or allow movement of the point relative to the target body.

5. The system according to claim 1, further comprising a trigger for operating the detection of the target system by the position determination system.

6. A target system for use with a position determination system in determining the location of a position on a vehicle, comprising:

a target body;

one or more target elements disposed on the target body and detectable by the position determination system;

a point definer extending from the target body, the point definer including a point capable of being located adjacent the position on the vehicle, and a trigger for operating the detection of the target system by the position determination system, wherein the trigger operates the position determination system by selectively changing the detection of one or more of the target elements by the position determination system, wherein the position determination system is configured to determine a location of the target body after detecting the target elements disposed on the target body.

7. The system according to claim 6, wherein the trigger is movable between one of two positions, and in a first of the two positions, the trigger conceals the one or more target elements from the position determination system, and in a second of the two positions, the trigger exposes one or more target elements to the position determination system.

8. A target system for use with a position determination system in determining the location of a position on a vehicle, comprising:

a target body;

one or more target elements disposed on the target body and detectable by the position determination system;

a trigger positioned on the target body and remote from the position determination system, the trigger operating the position determination system by selectively changing the detection of one or more of the target elements by the position determination system; and a point definer extending from the target body, and the point definer including a point at a distal end of the point definer, the point being capable of being located adjacent the position on the vehicle, and the point being at a known location from the target body, wherein the position determination system determines a location of the target body after detecting the target elements disposed on the target body.

9. A position determination system for determining the location of a position on an object, comprising:

a target system including a target body, at least three visually perceptible target elements disposed on the target body in a two dimensional array configuration:

a point definer extending from the target body, the point definer including a point capable of being located adjacent the position on the object, a handle extending from the target body, positioned and configured to prevent the target elements from being visually obscured when held by a user; and a vision imaging system configured to acquire an image of the target body to generate image information describing geometric characteristics and positional interrelationships of the target elements disposed on the target body imaged, and to relate such image information to predetermined reference information describing known geometric characteristics and positional interrelationships of the target elements to determine a location and angular orientation of the target body;

wherein the point definer includes one or more joints that enable the point to be positioned at a different location relative to the target body.

10. The system according to claim 9, wherein the one or more joints each allow rotation of the point in one or more axis relative to the target body.

11. The system according to claim 9, wherein the point definer includes one joint allowing the point to rotate along one axis, the point being positionable in any one of three positions relative to the target body.

12. The system according to claim 9, wherein each joint includes a lock to selectively prevent or allow movement of the point relative to the target body.

13. A position determination system for determining the location of a position on an object, comprising:

a target system including a target body, at least three visually perceptible target elements disposed on the target body in a two dimensional array configuration;

a point definer extending from the target body, the point definer including a point capable of being located adjacent the position on the object, a handle extending from the target body, positioned and configured to prevent the target elements from being visually obscured when held by a user;

a vision imaging system configured to acquire an image of the target body to generate image information describing geometric characteristics and positional interrelationships of the target elements disposed on the target body imaged, and to relate such image information to predetermined reference information describing known geometric characteristics and positional interrelationships of the target elements to determine a location and angular orientation of the target body; and a trigger for orientating the detection of the target system by the vision imaging system;

wherein the trigger operates the position determination system by selectively changing the detection of one or more of the target elements by the vision imaging system.

14. The system according to claim 13, wherein the trigger is movable between first and second positions, and in a first position, the trigger conceals the one or more target elements from the vision imaging system, and in the second position, the trigger exposes the one or more target elements to the vision imaging system.

15. A position determination system for determining the location of a position on a vehicle, comprising:

a vision imaging system; and a target system including a target body;

one or more target elements disposed on the target body and detectable by the vision imaging system;

a trigger positioned on the target body and remote from the vision imaging system, the trigger operating the vision imaging system by selectively changing the detection of one or more of the target elements by the vision imaging system; and a point definer extending from the target body, and the point definer including a point at a distal end of the point definer, the point being capable of being located adjacent the position on the vehicle, and the point is at a known location from the target body;

wherein the vision imaging system is configured to determine a location of the target body after detecting the target elements disposed on the target body.

16. A position determination system for determining the location of a position on a vehicle, comprising:

a vision imaging system; and a target system including a target body, one or more target elements disposed on the target body and detectable by the position determination system, and a point definer extending from the target body, the point definer including a point capable of being located adjacent the position on the vehicle, the point definer further including one or more joints that enable the point to be positioned at a different location relative to the target body;

wherein the vision imaging system is configured to determine a location of the target body after detecting the target elements disposed on the target body.

17. The system according to claim 16, wherein the one or more joints each allow rotation of the point in one or more axis relative to the target body.

18. The system according to claim 16, wherein the point definer includes one joint allowing the point to rotate along one axis, the point being positionable in any one of three positions relative to the target body.

19. The system according to claim 16, wherein each joint includes a lock to selectively prevent or allow movement of the point relative to the target body.

20. The system according to claim 16, further comprising a trigger for operating the detection of the target system by the vision imaging system.

21. A position determination system for determining the location of a position on a vehicle, comprising:

a vision imaging system; and a target system including a target body, one or more target elements disposed on the target body and detectable by the position determination system, a point definer extending from the target body, the point definer including a point capable of being located adjacent the position on the vehicle, and a trigger for operating the detection of the target system by the vision imaging system, wherein the trigger operates the position determination system by selectively changing the detection of one or more of the target elements by the vision imaging system;

wherein the vision imaging system is configured to determine a location of the target body after detecting the target elements disposed on the target body.

22. The system according to claim 21, wherein the trigger is movable between first and second positions, and in a first position, the trigger conceals the one or more target elements from the vision imaging system, and in the second position, the trigger exposes the one or more target elements to the vision imaging system.

23. A position determination system for determining the location of a position on a object, comprising:

a target system including a target body, one or more target elements disposed on the target body, and a point definer extending from the target body, the point definer including a point capable of being located adjacent the position on the object;

detection means for detecting the target elements disposed on the target body to obtain element information;

first determination means for determining a location of the target body based on the element information obtained by the detecting means to obtain location information of the target body; and second determination means for determining the location of the point with respect to the target body based on the location information, wherein the detection means obtains at least three sets of element information obtained from the same target elements located in different locations each time the detecting means detects it while its point is located at the same position on the object, the first determination means determines the location of the target body based on each of the at least three sets of the element information to obtain at least three sets of location information, and the second determination means determines the location of the point with respect to the target body based on the at least three sets of the location information.

* * * * *